(12) United States Patent
Demmer et al.

(10) Patent No.: US 11,787,273 B2
(45) Date of Patent: Oct. 17, 2023

(54) ROOF MODULE FOR A VEHICLE ROOF OF A PASSENGER VEHICLE

(71) Applicant: Daimler AG, Stuttgart (DE)

(72) Inventors: Achim Demmer, Magstadt (DE); Eberhard Benz, Gaertringen (DE)

(73) Assignee: Daimler AG, Stuttgart (DE)

( * ) Notice: Subject to any disclaimer, the term of this patent is extended or adjusted under 35 U.S.C. 154(b) by 125 days.

(21) Appl. No.: 17/268,411

(22) PCT Filed: Jul. 25, 2019

(86) PCT No.: PCT/EP2019/070068
§ 371 (c)(1),
(2) Date: Feb. 12, 2021

(87) PCT Pub. No.: WO2020/035280
PCT Pub. Date: Feb. 20, 2020

(65) Prior Publication Data
US 2022/0118836 A1    Apr. 21, 2022

(30) Foreign Application Priority Data
Aug. 13, 2018    (DE) ...................... 10 2018 006 363.2

(51) Int. Cl.
*B60J 7/057*    (2006.01)
*B60J 7/22*    (2006.01)
(Continued)

(52) U.S. Cl.
CPC .............. *B60J 7/0573* (2013.01); *B60J 7/22* (2013.01); *B60J 7/0015* (2013.01); *B60J 7/043* (2013.01)

(58) Field of Classification Search
CPC . B60J 7/0573; B60J 7/22; B60J 7/0015; B60J 7/043; B60J 7/067; B60J 7/022
(Continued)

(56) References Cited

U.S. PATENT DOCUMENTS

| 4,243,261 A | 1/1981 | Trenkler |
| 6,513,864 B2 | 2/2003 | Boehm et al. |
| (Continued) | | |

FOREIGN PATENT DOCUMENTS

| DE | 28 99 379 A1 | 9/1979 |
| DE | 4313 687 A1 | 11/1994 |
| (Continued) | | |

OTHER PUBLICATIONS

Shlaf et al., "Manufacturing method for passenger automobile with modular body construction and closed passenger cell with associated parts pre-fitted to body modules before final assembly", Jan. 5, 2005, Publisher: German Patent Office, DE10324793A1 (Year: 2005).*

(Continued)

*Primary Examiner* — Dennis H Redder
*Assistant Examiner* — Joyce Eileen Hill
(74) *Attorney, Agent, or Firm* — Crowell & Moring LLP

(57) ABSTRACT

A roof module for a vehicle roof of a passenger vehicle includes a module frame which includes a front module frame transverse element, a rear module frame transverse element, a first lateral module frame longitudinal element, and a second lateral module frame longitudinal element, where the first and the second lateral module frame longitudinal elements connect the front and the rear module frame transverse elements to each other. A cover element is mounted on the module frame. The front module frame transverse element is a first shell element and the first shell element is connectable to a second shell element of a roof frame of the vehicle roof. When the first shell element is connected to the second shell element they together form a roof crossmember of the vehicle roof which encloses a cavity.

11 Claims, 3 Drawing Sheets

(51) Int. Cl.
  *B60J 7/00* (2006.01)
  *B60J 7/043* (2006.01)

(58) Field of Classification Search
  USPC ......... 296/216.01, 216.06, 216.07, 210, 214, 296/222, 223, 180.1
  See application file for complete search history.

(56) References Cited

U.S. PATENT DOCUMENTS

| | | | |
|---|---|---|---|
| 6,520,570 B2 | 2/2003 | Schaetzler | |
| 8,141,942 B2* | 3/2012 | Mathes | B62D 25/06 296/210 |
| 2002/0024239 A1* | 2/2002 | Schatzler | B60J 7/0573 296/210 |
| 2009/0033128 A1* | 2/2009 | Hoelzel | B60J 7/022 296/216.01 |

FOREIGN PATENT DOCUMENTS

| | | | |
|---|---|---|---|
| DE | 100 46 674 A1 | 3/2002 | |
| DE | 10324793 A1 * | 1/2005 | ........... B62D 63/025 |
| DE | 19 2004 950 107 A1 | 4/2006 | |
| DE | 19 2015 998 841 A1 | 1/2017 | |
| DE | 10 2016 009 136 A1 | 2/2017 | |
| DE | 10 2015 013 751 A1 | 5/2017 | |
| JP | 2006-315528 A | 11/2006 | |
| WO | WO-2017005352 A1 * | 1/2017 | .............. B60J 7/022 |

OTHER PUBLICATIONS

Demmer et al., "Roof Module for a Motor Vehicle", Jan. 12, 2017, Publisher: WIPO/German Patent Office, Edition: WO2017005352A1 (Year: 2017).*

PCT/EP2019/070068, international Search Report dated Nov. 7, 2019 (Two (2) pages).

German-language German Office Action issued in German application No. 10 2018 006 363.2 dated Jun. 28, 2019 (Six (6) pages).

* cited by examiner

ROOF MODULE FOR A VEHICLE ROOF OF A PASSENGER VEHICLE

BACKGROUND AND SUMMARY OF THE INVENTION

The invention relates to a roof module for a vehicle roof of a passenger vehicle. Furthermore, the invention relates to a passenger vehicle. Furthermore, the invention relates to a method for producing a vehicle roof of a motor vehicle.

Such a roof module for a vehicle roof of a passenger vehicle is known from DE 10 2015 013 751 A1 and comprises a front and a rear module frame transverse element and respective lateral module frame longitudinal elements which are connected to one another to form a peripheral, at least substantially rectangular, module frame. Moreover, the roof module comprises at least one covering element in the form of a displaceable shifting and/or lifting cover, which is guided or mounted on the module frame.

The entire roof module is inserted into a roof opening of the vehicle body which is delimited by roof transverse and longitudinal frame parts on the side of the bodyshell. These are usually formed in each case from two shell elements which are joined to each other by forming a respective cavity by means of corresponding flanges or similar. This arrangement of the roof module on the vehicle roof overall requires a relatively large amount of construction space, on the one hand for the respective transverse and longitudinal frame parts, formed as hollow girders, of the vehicle roof and, on the other hand, for the respective module frame transverse and longitudinal elements of the roof module. Thus, for example, components of the roof module, such as the drive of the shifting and/or lifting cover, for example, can only be arranged in front of the front roof crossmember on the side of the bodyshell, when seen in the forwards driving direction of the vehicle. In turn, this causes the viewing opening, visible for a vehicle occupant, of the roof module to be able to be extended forwards at most up to the components, whereby the amount of light of the viewing opening overall can be measured as correspondingly lower.

Furthermore, a roof module emerges from DE 100 46 674 A1 in which the drive engine for a shifting/lifting cover according to a first design variant is housed in a cavity of the front module frame crossmember, which is designed in shell construction. According to a second design variant of the roof module, the drive engine is arranged directly below the front module frame crossmember formed as a hollow girder. It is common to both design variants that the roof module has a correspondingly large height at least in its front region, which has an unfavorable effect on the head freedom of the front passengers.

The object of the present invention is to create a roof module for a vehicle roof and a passenger vehicle having a roof module arranged in a roof opening, which have a relatively high degree of rigidity with a simultaneously reduced overall weight of the vehicle roof construction. The object of the invention is also to specify a production method for a vehicle roof, which is suitable for receiving a roof module with a relatively large viewing surface and additionally makes a low overall weight of the roof construction possible.

The roof module comprises a module frame which has a front and a rear module frame transverse element and respective lateral module frame longitudinal elements, and at least one covering element which is mounted on the module frame. The roof module is characterized in that, when seen in the forwards driving direction of the passenger vehicle, the front module frame transverse element is formed as a shell element, which is to be connected to a shell element on the bodyshell by forming a roof crossmember enclosing a cavity. In contrast to known roof modules, in which the front module frame transverse element is attached to an already produced, usually bivalent, roof crossmember, it is now correspondingly provided according to the invention to create one single, i.e., common, front roof crossmember for the bodywork roof and the module flame, which, on one hand, is formed by a shell element on the bodyshell side and, on the other hand, by the front module frame transverse element as the second shell element. This roof crossmember is correspondingly a kind of hybrid part, consisting of, on the side of the bodyshell, a lower and, on the side of the roof module, an upper respective shell element, wherein the two shell elements can be formed from respective metal alloys or even from plastic. A classic hybrid part is also conceivable here, i.e., one of the shell elements can consist of a metal material, for example, and the other shell element of a plastic material. However, it is essential that a box beam-shaped roof crossmember made of a shell element on the bodyshell side and of a shell element on the roof module side be formed, which only emerges when mounting the roof module on the motor vehicle. In comparison to the classic constructions, i.e., a multivalent bodywork roof crossmember, on which an additional frame transverse element of the roof module is set and placed when shifted backwards, the front roof crossmember composed in such a way also makes possible the possibility of a reduction of the construction space to be provided in the longitudinal direction of the vehicle and thus an enlarged viewing opening for the vehicle occupants along with weight advantages.

A further advantage of this construction of the shell element on the bodyshell side and the shell element on the roof module side is that the cavity enclosed by these or the constructive space of the roof crossmember can additionally be used, in particular for housing other components, for example a drive of the cover element or a shading roller blind, such that in particular the amount of light of a viewing opening for the vehicle occupants can be enlarged towards the front. For the vehicle occupants, this means more space or more comfortable viewing through the enlarged viewing opening of the roof module.

An exemplary embodiment of the roof module is particularly preferred in which at least one drive is provided for shifting the cover element or a roller blind for shading an interior space of the vehicle, wherein, in a pre-mounting stage, at least one part of the drive is arranged and fixed stationarily on the side of the front module frame transverse element facing towards the shell element on the bodyshell side, such that this part of the drive is arranged inside the cavity when the roof module is mounted on the vehicle roof. The drive is preferably an electrical drive, in particular an electrical motor, which drives at least one drive cable, preferably with tensile and compressive rigidity and interacting with the cover element or the roller blind or which serves the displacement of this.

According to an advantageous exemplary embodiment, the cavity of the roof crossmember is thus used to house parts of the drive for the moveable cover element and/or a shading roller blind, wherein the fixing of the drive is carried out before inserting the roof module in the roof opening on the bivalent front module frame transverse element. Thus, when mounting the roof module, an arrangement of the drive inside the cavity of the roof crossmember emerging by means of the insertion of the roof module from above into an opening of the vehicle roof emerges, which up until now had to be arranged outside this and accordingly limited the construction space in the manner described. Up until now, this had therefore not specifically been possible, since the front roof crossmember had already been produced on the bodyshell side and accordingly, in the subsequent mounting of the roof module, components could no longer be arranged inside the cavity of the roof crossmember. As a result of the front roof crossmember now only being formed or closed when mounting the roof module, housing the components in the cavity preferably closed on the peripheral side of the roof crossmember is now possible. Furthermore, it is advantageous that at least one component of the drive is arranged on an inner side, facing towards the cavity of the roof crossmember, on the front module frame transverse element. When connecting the module frame transverse element to the shell element on the bodyshell side, the arrangement of the respective drive components inside the cavity of the emerging roof crossmember thus inevitably emerges.

Along with the components of the drive, other components can naturally also be housed inside the cavity of the emerging roof crossmember by these components being fixed on the front module frame transverse element, for example, and then positioned inside the cavity when connecting to the shell element on the bodyshell side.

In a further design of the invention, the front module frame transverse element has a molding for receiving a wind deflector on its side facing away from the shell element on the bodyshell side, wherein the molding protrudes into the cavity of the roof crossmember. A wind deflector is received in this gully- or groove-shaped molding that extends across at least a considerable part of the length of the roof crossmember. Thus, the wind deflector can also be housed in a particularly space-efficient manner. Because of the design of the front roof crossmember according to the invention, on which the windscreen abuts or rests with its rear upper edge region, there is the possibility of arranging the wind deflector clearly further forwards in the longitudinal direction of the vehicle (x-direction), i.e., effectively in the roof frame region, in opposition to the arrangement common with known motor vehicles in principle in the x-direction behind the roof frame, which clearly improves the effectiveness of the wind deflector, in particular the aeroacoustics.

The advantages described above in connection with the roof module according to the invention emerge in a similar way for the passenger vehicle according to the invention. Furthermore, this is characterized in that the front module frame transverse element is formed as a shell element, which is connected to a shell element on the bodyshell side by forming a roof crossmember enclosing a cavity. In doing so, a positioning of the module frame element that is particularly favorable in terms of the construction space can be achieved, such that a roof opening lying behind it, when seen in the x-direction in opposition to the forwards driving direction of the passenger vehicle, of the roof module can be designed to be particularly large or that the roof crossmember formed by the front module frame transverse element and the shell element on the bodyshell side can be arranged particularly far in front and thus in a manner that is particularly space-efficient.

An exemplary embodiment of the passenger vehicle is preferred in which, after the insertion of the roof module into the bodywork opening on the roof side, the front module frame transverse element is connected to the A-pillars on its end regions both directly or by means of at least one attachment element, for example a connection console or similar. Thus, despite the combined roof crossmember-module frame transverse element-shell construction that is construction space-effective and that is constructed to be relatively flat in the horizontal direction of the vehicle (z-direction) and to be relatively short in the longitudinal direction of the vehicle (x-direction), a relatively high degree of bodywork rigidity can be achieved. In a preferred embodiment, it is provided here that the front module frame transverse element formed as a shell element and the shell element on the bodyshell side each have flanges on which they abut on one another and are also connected to one another there. The cavity thus delimited between these parts of the roof crossmember effectively formed as a hollow girder is effectively sealed on the end sides when attaching the module frame transverse element to the A-pillars.

In a particularly advantageous exemplary embodiment (FIG. 1) of the passenger vehicle, it is provided that the front module frame transverse element having a front end region protrudes below the windscreen of the motor vehicle and that the windscreen is supported from below in its rear upper transverse edge region by the front module frame transverse element. This thus means that the windscreen abuts on the front roof crossmember, in particular its upper shell element, which is formed by the front module frame transverse element of the roof module, and is preferably fixed thereon, in particular by means of an adhesive connection and/or a releasable mechanical connection, for example a screw connection.

In an alternative exemplary embodiment (FIG. 3) of the passenger vehicle, the shell element on the bodyshell side extends towards the front beyond the front module frame transverse element with a flange, on which the windscreen is fixed, and that, when seen in the longitudinal direction of the vehicle, the front module frame transverse element also abuts on and is fixed to this flange in a rear-offset manner. This embodiment makes it possible for the windscreen to be or already be able to be connected to the shell element on the bodyshell side, in particular be adhered, before the roof module is inserted into the roof opening of the bodywork and the front crossmember is completed by fitting the front module frame transverse element.

Furthermore, an exemplary embodiment of the passenger vehicle is preferred in which the windscreen with a rear upper transverse edge is adjacent to a front transverse edge of the cover element of the roof module. Thus, a gap or a seam is formed between the windscreen and the displaceable cover element arranged in a closed position which extends in the transverse direction of the vehicle. Because of the extension of the cover element in the longitudinal direction of the vehicle directly up to the windscreen, the front roof crossmember arranged below this of the vehicle bodywork is overlaid or covered from above both partially by the windscreen and partially by the covering element of the roof module.

A further advantageous embodiment (FIG. 1) of the invention provides that the front module frame transverse element and the shell element on the bodyshell side end at least substantially flush towards the front and the front module frame transverse element protrudes backwards with an end region. Thus, from the front, a connection flange of the two shell elements can be arranged particularly far to the front, such that a maximum cavity of the formed roof crossmember is available, for example for housing respective components of the roof module. Further functional regions can be provided on the end region of the front module frame transverse element extending backwards, for example receivers for seals of the displaceable cover element of the roof module.

Finally, it has proved to be advantageous when the front module frame transverse element is provided with a molding for receiving a wind deflector on its side facing away from the shell element on the bodyshell side, wherein the molding protrudes into the cavity of the roof crossmember and is so deep that the front module frame transverse element and the shell element on the bodyshell side can be or are connected to each other in this region of the roof crossmember. Such a connection of the two shell elements, which is preferably central when seen in the longitudinal direction of the motor vehicle, here has the particular advantage that the emerging roof crossmember can be formed particularly stably and rigidly. In addition, by means of the positioning of the connection point of the two shell elements, the size of respective cavities of the roof girder can be varied, in order to achieve a stable cavity, for example, exactly in the front region, which can completely fulfil the function of the previous roof crossmember on the bodyshell side.

A method is also provided to solve the object. This provides that firstly a lower shell element forming a part of a roof crossmember arranged on the upper transverse edge of a windscreen of the motor vehicle is connected to respective A-pillars that are laterally holding and delimiting a windscreen in the produced state of the motor vehicle in order to produce a vehicle roof of a motor vehicle, the vehicle roof being provided with a roof module according to the invention. Subsequently to this, the roof module according to the invention is inserted from above into the roof opening of the vehicle roof, which is delimited by the roof frame on the bodywork side. Here, a front module frame transverse element formed as a shell element is placed into the lower shell element on the bodyshell/bodywork side, which together enclose a cavity, and is connected to this. Thus, the front roof crossmember on the bodywork side is only produced or manufactured by the insertion.

According to a first design variant of the method, the windscreen is inserted into the front opening delimited laterally by the A-pillars, from above by the upper roof crossmember and a lower crossmember on the bodywork side which is also referred to as a lower windscreen crossmember only after the insertion of the roof module into the roof opening of the bodywork and, here, is connected, in particular adhered, to the components delimiting the front opening. In doing so, a frame construction of the vehicle roof and of the vehicle roof, the frame construction being constructed particularly narrowly in the longitudinal direction of the vehicle, emerges which additionally has only a small construction height. The advantages with the possible housing of the at least one part of the drive for displacing the cover element and/or a roller blind for shading an interior space of the vehicle thus readily emerge, as already described above.

According to a second design variant of the method, the windscreen is already connected, in particular adhered, to a flange protruding forwards in the longitudinal direction of the vehicle of the shell element on the bodyshell side, and indeed before the roof module is inserted into the roof opening of the motor vehicle shell construction. The attachment region on the shell element on the bodyshell side for the shell element forming the module frame transverse element is accordingly rear-offset towards the back when seen in the longitudinal direction of the vehicle.

Further advantages and details of the invention emerge from the description below as well as by means of the drawings.

DETAILED DESCRIPTION OF THE DRAWINGS

Figure 1:
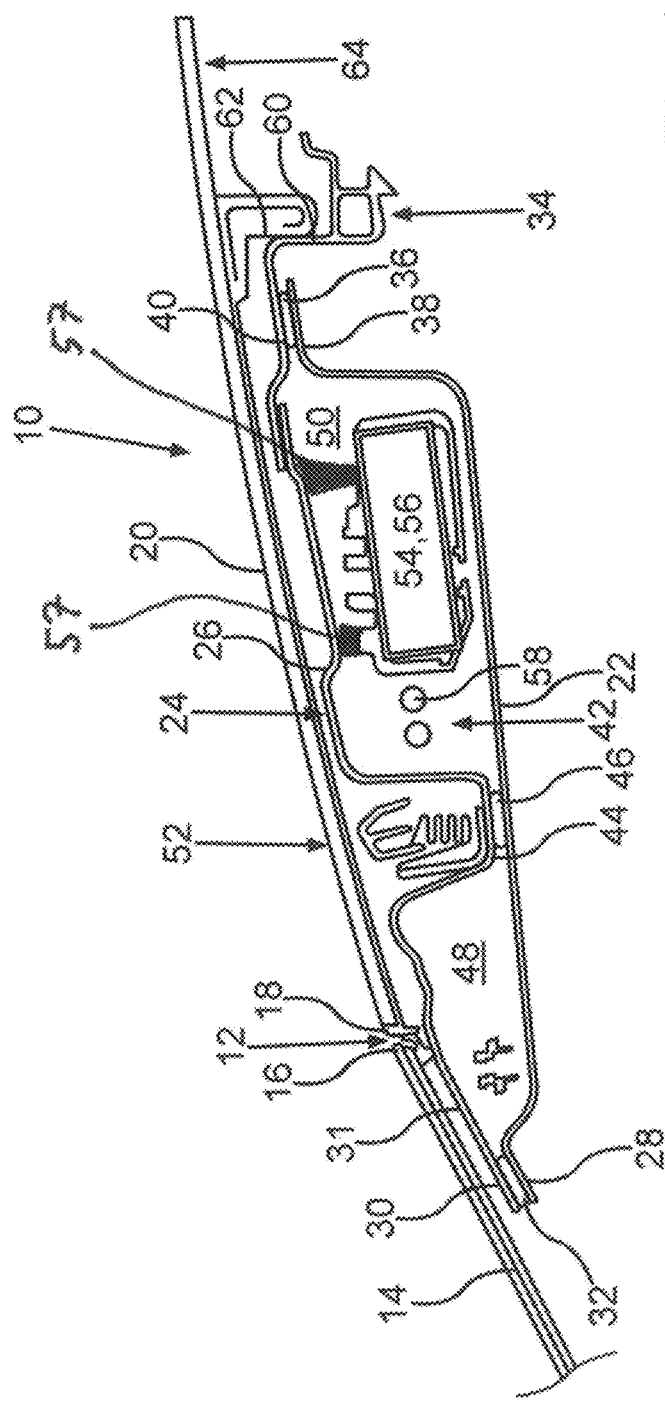
FIG. 1 is a sectional plane running in sections in the vertical direction of the vehicle and in the longitudinal direction of the vehicle by means of the arrangement of a first exemplary embodiment of a roof module in a roof opening of a first exemplary embodiment of a vehicle roof of a passenger vehicle in the region of a front roof crossmember of the motor vehicle bodywork arranged adjacently to a windscreen of the motor vehicle.

In FIG. 1, in a sectional view in portions, an arrangement of a roof module 10 in a roof opening 12 of a vehicle roof of a passenger vehicle is depicted on a sectional plane running in the longitudinal direction of the vehicle (x-direction) and in the vertical direction of the vehicle (z-direction) and arranged laterally offset in relation to the longitudinal central axis of the vehicle in relation to the transverse direction of the vehicle (y-direction). Here, a front pane 14 often referred to is a windscreen can firstly be seen which is, with a rear upper transverse wall 16, adjacent to a front transverse edge 18 of a cover element 20 of the roof module 10 that will be explained in more detail below.

The roof opening 12 of the motor vehicle on the bodywork/bodyshell side into which the roof module 10 is inserted is delimited by roof frame longitudinal elements running in the longitudinal direction of the vehicle and roof frame transverse elements connecting them to one another and running in the transverse direction of the vehicle, which are also referred to as longitudinal or transverse spars. The roof frame transverse elements/spars are furthermore also referred to as roof crossmembers. The roof frame longitudinal and transverse elements are often, i.e., also in a particularly preferred exemplary embodiment of the invention, each formed in a shell construction manner, i.e., each of these frame elements on the bodywork side is respectively formed from at least two shell elements which are joined to one another by means of corresponding flanges or similar by forming a respective cavity. The frame elements can also respectively be provided with a reinforcement and towards the outside of the motor vehicle with an outer paneling. It is important that at least the front roof frame transverse element or the front roof crossmember is designed in a shell construction manner by the roof frame longitudinal and transverse elements.

Furthermore, in FIG. 1, a shell element 22 on the bodyshell side of roof crossmember 24 explained in more detail below can be seen, which is connected to respective A-pillars not depicted here that laterally hold and delimit the windscreen 14. The shell element 22 is thus an integral part of the motor vehicle bodywork also referred to as the shell construction or support structure. The shell element 22 is thus a part of the roof frame of the motor vehicle bodywork delimiting the roof opening 12.

The shell element 22 is produced from the same sheet, for example, from which the respective shell elements forming the A-pillars are produced. Other materials, based on respective metal alloys or plastic materials, are of course also conceivable. In a preferred exemplary embodiment, the shell element 22 is a deep-draw part, which is reshaped from a sheet blank cut, for example a plate, tablet, board or similar, or a corresponding pre-product, into a hollow body open on one side by means of a corresponding deep-draw method. It is important that the shell element 22 extend between the A-pillars and is fixedly attached to the A-pillars with or on its end regions.

According to the invention, it is provided that the shell element 22 forms the front roof crossmember 24 of the motor vehicle bodywork or at least the base body of the roof crossmember 24 to which the reinforcement parts, insulating materials and similar can then be attached. In contrast to with known motor vehicles, the roof crossmember 24 is thus not a classical hollow profile, at least not before the roof module 10 according to the invention is attached to the motor vehicle bodywork, which will be explained in yet more detail below.

The roof module 10 comprises a module frame that is preferably closed on the peripheral side and has a receiver opening for the cover element 20 and is formed from a front module frame transverse element 26 and a rear module frame transverse element not depicted in the figures as well as lateral module frame longitudinal elements connecting the module frame transverse elements to one another. In this exemplary embodiment, the module frame overall has a rectangular shape. The module frame transverse elements and the module frame longitudinal elements can here be formed integrally or even in several parts and joined or connected in another manner to form a corresponding construction.

In a preferred embodiment, it is preferred that, of the module frame elements, at least the front module frame element 26 is a shell element, which is thus open on one side or has a hollow body open on one side. In the context of the present invention, the term "shell" or "shell element" is to be understood as a planar support structure, i.e., in particular a body, the thickness of which is only very small in relation to its other measurements. Here, this body can be formed to be curved or, when seen in the cross-sectional view, have a curvature. Additionally or alternatively, this body can also be provided with an at least partially angular cross-section shape having at least one indentation or, in the extreme case, can be formed as a plate or pane and thus, in the case of the module frame element 26, eventually as a cover or sealing plate for the shell element 22 on the bodywork side.

Here, analogously to the shell element 22, the module frame transverse element 26 can be a deep-drawn part, which is reshaped from a sheet blank cut, for example a plate, tablet, board or similar, or a corresponding pre-product, into a hollow body open on one side by means of a corresponding deep-draw method. Of course, the module frame element 26 and the shell element 22 forming a part of vehicle bodywork can also consist of different materials, for example one of metal and the other of plastic material.

The cover element 20 is mounted on the module frame, in the present case the cover element being shiftable in the longitudinal direction of the vehicle and/or able to fold out with a rear end. Here, according to a particular exemplary embodiment of the roof module, a further cover element can be provided in addition to the displaceable cover element 20 which is arranged fixedly on the roof frame or the module frame.

In the installed state of the roof module 10 on the motor vehicle, the shell element 22 of the roof frame on the bodyshell side here forms a lower shell element on which the front module frame element 26 on the roof module side can be placed from above when inserting the roof module 10 into the roof opening 12 of the motor vehicle bodywork. The shell element 22 and the module frame transverse element 26 are connected to one another, for example adhered to one another, and together form a hollow support, wherein here the module frame element 26 functions as a second shell element.

The present roof module 10 or its arrangement on the vehicle roof is now characterized in particular in that the shell element on the upper side and on the module side or module roof frame transverse element 26 and the lower shell element 22 on the bodyshell side together form the front roof crossmember 24 which extends at least partially in superposition with the rear end of the windscreen 14 or supports the windscreen 14 in the region of its rear transverse edge 16, which is, however, not shown in FIG. 1.

As can be seen in FIG. 1 in particular, the module frame transverse element 26, which can be formed integrally or in several parts and is formed, for example, from a metal alloy or a plastic or in a mixed construction, extends forwards with an end region 31 up to below the windscreen 14 and ends substantially flush with a front end of the shell element 22 on the bodyshell side, wherein the two shell elements 22, 26 each have flanges 28, 30, which are connected via an adhesive connection in the form of at least one adhesive bead 32. Instead of such an adhesive connection, a different joining connection and/or mechanical connection would of course also be conceivable.

The module frame transverse element 26 extends backwards, i.e., in the longitudinal direction of the vehicle (x-direction), further than the shell element 22 on the bodyshell side, and it juts out with an end region 34. The two shell elements 22, 26 are connected in front of this end region 34 via at least one further adhesive bead 36, which is arranged between a flange 38 of the shell element 22 on the bodyshell side and a wall 40 of the module frame transverse element 26. The two shell elements 22, 26 here enclose a peripherally closed cavity 42 or form a box profile of the roof crossmember 24.

In the exemplary embodiment depicted in the figures, the roof crossmember 24 has a substantially U-shaped molding 44 at a spacing apart from the windscreen 14 measured in the longitudinal direction of the vehicle (x-direction) on its upper side, i.e., the side facing towards the cover element 20, the molding being so deep that it directly touches the lower shell element 22 with its base portion and is additionally connected exactly there to the lower shell element 22 by means of at least one additional adhesive bead 46. By means of the molding 44, the cavity 42 of the roof crossmember 24 is divided into two cavities, namely a front cavity 48 and a rear cavity 50, whereby a further improved degree of stability of the roof crossmember 24 emerges.

In addition, the U-shaped molding 44 extending in the transverse direction of the vehicle, and thus being effectively gulley-like, is used to receive or to house a wind deflector 52 in it, which is extended beyond the outer side of the module frame transverse element 26 backwards when shifting the cover element 20 in the longitudinal direction of the vehicle (x-direction) or upwards when opening the cover element 20 in the vertical direction of the vehicle (z-direction) in order to lead wind over the opening released by the cover element 20.

Figure 2:
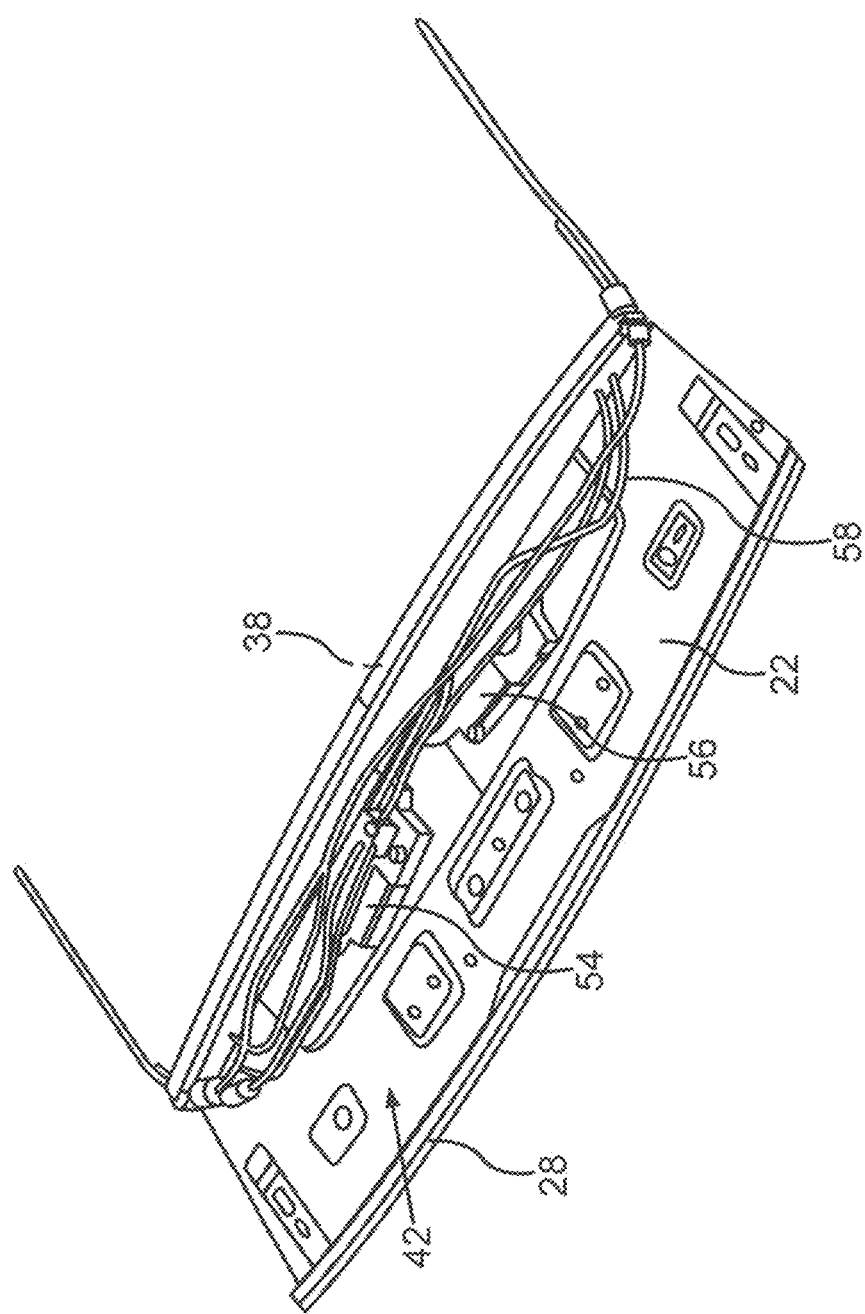
FIG. 2 is a perspective depiction of a lower shell element of a front roof crossmember on the bodyshell side on which several drive components of a drive of a displaceable cover element of the roof module are shown in their installation position.

When seen together with FIG. 2, which shows the shell element 22 on the bodyshell side in a perspective view, it can be seen that various drive components of the roof module 10, for example an electrical drive 54 for the cover element 20, an electrical drive 56 for a roller blind for shading the interior space of the vehicle if the cover element 20 is formed transparently, and respective drive cables 58 that usually have tensile and compressive rigidity for displacing the cover element 20 and the roller blind are provided. In the pre-mounted state of the roof module 10, all of these components, yet at least the electrical drive 54 for the cover element 20 and the at least one corresponding drive cable which is to be coupled with the cover element 20, are preferably arranged on the roof module 10. Here, at least the electrical drive 54 is thus positioned on the roof module 10 so that it is arranged in the roof module 10 applied on the motor vehicle in the cavity 42 of the roof crossmember 24.

Here, it is conceivable, for example, overall to pre-mount the respective drive components 54, 56, 58 on sides of the module frame transverse element 26 of the roof module 10, such that, in the final mounting of the roof module 10 on the vehicle roof, the arrangement of the respective drive components 54, 46, 58 emerges automatically in the cavity 42 of the roof crossmember 24.

It can be seen in FIG. 1 that the drives 54 and 56 are attached on the side of the bivalent module frame transverse element 26 forming an inner wall of the cavity 42 of the roof crossmember 24 by means of brackets 57 and, in this exemplary embodiment, are formed practically in such a way that the drives 54, 56 hang downwards from the shell element of the module frame transverse element in the z-direction and are here arranged contactlessly with the other wall regions of the cavity 42, in particularly with the shell element 22 on the bodyshell side. Narrow tolerances for the module frame and the motor vehicle bodywork are thus not necessary at this point.

Finally, it can be seen in FIG. 1 that the rear end region 34 of the front module frame transverse element has further functional regions, for example a stop 60 for a support and sealing element 62, on sides of the cover element 20 shiftable in the longitudinal direction of the vehicle.

Overall, it can thus be seen that presently a roof module 10 is created in which the front module frame transverse element 26 is joined together with the shell element 22 provided on the bodyshell side to form the roof crossmember 24 when mounting the roof module 10 in the vehicle roof, namely by using the cavity 42 emerging in doing so, in which corresponding functional elements such as the respective drive components 54, 56, 58 are housed. By housing these diverse components, the rear end region 34 of the module frame transverse element 26 ends further forwards in relation to the longitudinal direction of the vehicle (x-direction), such that a roof opening, which is attached to this rear end region 34, can be pulled further forwards. Thus, this viewing opening 64 is formed to be larger, thus having a larger amount of light. This means that the viewing opening 64 has at least one greater light length (light width) which results in an improved degree of comfort for the seat occupant. Moreover, by housing the diverse functional components inside the cavity 42 of the roof crossmember 24, construction space can be saved, which would otherwise have to be arranged outside the roof crossmember 24. Moreover, the total weight of the motor vehicle with at least approximately equivalent rigidity of the bodywork can be reduced, since the bivalent module frame transverse element 26 and the shell element 22 on the bodyshell side are supplemented to form the hollow roof crossmember 24 having a high degree of rigidity.

Figure 3:
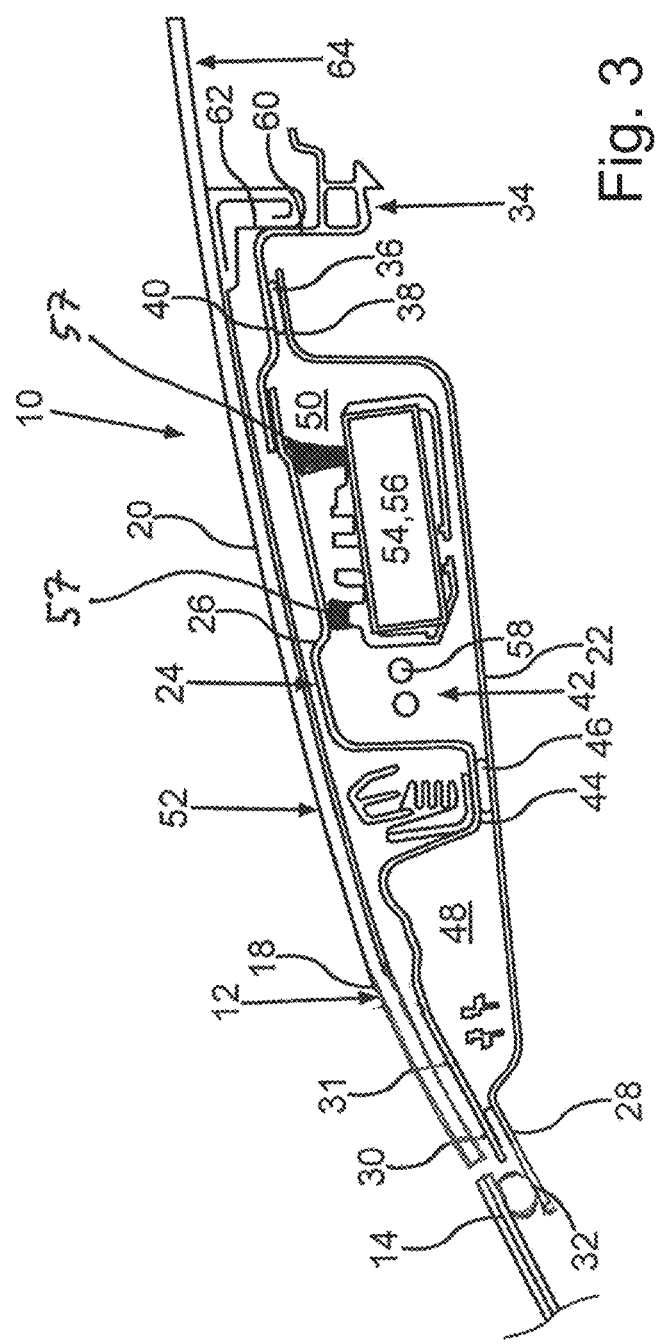
FIG. 3 is a sectional plane running in sections in the vertical direction of the vehicle and in the longitudinal direction of the vehicle by means of the arrangement of a second exemplary embodiment of a roof module in a roof opening of a second exemplary embodiment of a vehicle roof of a passenger vehicle in the region of a front roof crossmember of the motor vehicle bodywork arranged adjacently to a windscreen of the motor vehicle.

FIG. 3 shows a second exemplary embodiment of the passenger vehicle having a roof module 10 according to the invention. The same parts are provided with the same reference numerals, such that in this respect reference is made to the description of the preceding figures. The substantial difference to the exemplary embodiment according to FIG. 1 is that the flange 28 of the shell element 22 on the bodyshell side lengthens forwards or, according to the other exemplary embodiment, the flange 30 of the front module frame transverse element 26 is correspondingly shortened. In doing so, an attachment of the windscreen 14 to the shell element 22, as depicted, is possible before the roof module 10 is inserted into the roof opening and the roof crossmember 24 is completed. The front module frame transverse element 26 also abuts on the flange 28 of the shell element 22 with its flange 30 and is connected, in particular also adhered, to this. It is advantageous with this exemplary embodiment that the windscreen 14 is already inserted without issue into the bodywork opening and can be fixed to the components delimiting these openings (A-pillars, lower crossmember, shell element 22) before the roof module 10 is inserted.

In summary, it remains to be stated that the design of the roof module 10 according to the invention or the bodywork of the passenger vehicle, in which the roof module is to be inserted, makes it possible to apply practically all components, in particular drive(s), drive cables, guiding/profile rails etc. on the roof module or its module frame in a pre-mounting step to adjust the covering element 20 and, where necessary—if provided—the at least one roller blind, such that the roof module can finally be delivered and inserted to the bodywork at least substantially completely in a functional manner. It is understood that the at least one cover element 20 is already installed/mounted on the roof module.

The invention claimed is:

1. A roof module for a vehicle roof of a passenger vehicle, comprising:
   a module frame which includes a front module frame transverse element, a rear module frame transverse element, a first lateral module frame longitudinal element, and a second lateral module frame longitudinal element, wherein the first and the second lateral module frame longitudinal elements connect the front and the rear module frame transverse elements to each other; and
   a cover element, wherein the cover element is mounted on the module frame;
   wherein the front module frame transverse element of the module frame of the roof module is a first shell element and wherein the first shell element is connectable to a second shell element of a roof frame of the vehicle roof;
   wherein when the first shell element is connected to the second shell element they together form a roof crossmember of the vehicle roof which encloses a cavity;
   wherein the front module frame transverse element has a molding on a side facing away from the second shell element to receive a wind deflector which protrudes into the cavity of the roof crossmember when the roof module is mounted on the vehicle roof.

2. The roof module according to claim 1 further comprising a drive for displacing the cover element in relation to the module frame or for displacing a roller blind for shading an interior space of the passenger vehicle, wherein at least a part of the drive is disposed and stationarily fixed on a side of the front module frame transverse element that faces towards the second shell element such that when the roof module is mounted on the vehicle roof the at least one part of the drive is disposed inside the cavity.

3. The roof module according to claim 2, wherein the drive comprises a motor which hangs on the front module frame transverse element and which hangs at a vertical spacing apart from the second shell element when the roof module is mounted on the vehicle roof.

4. The roof module according to claim 2, wherein the drive is held on the front module frame transverse element at a horizontal spacing apart from at least one of two side wall regions of the second shell element when the roof module is mounted on the vehicle roof.

5. A passenger vehicle; comprising:
a vehicle roof with a roof opening; and
the roof module according to claim 1 disposed in the roof opening;
wherein the first shell element of the module frame of the roof module is connected to the second shell element of the roof frame of the vehicle roof and together they form the roof crossmember of the vehicle roof which encloses the cavity;
wherein the roof crossmember is connected to respective A-pillars of the passenger vehicle which laterally hold and delimit a windscreen;
wherein the molding receives the wind deflector and wherein the molding protrudes into the cavity of the roof crossmember to a depth such that the front module frame transverse element and the second shell element are connectable to each other.

6. The passenger vehicle according to claim 5, wherein the front module frame transverse element is connected to the A-pillars on respective end regions of the front module frame transverse element.

7. The passenger vehicle according to claim 5, wherein the front module frame transverse element protrudes with a front end region below the windscreen and wherein the windscreen is supported from below in a rear upper transverse edge region by the front module frame transverse element.

8. The passenger vehicle according to claim 5, wherein the front module frame transverse element and the second shell element end at least substantially flush towards a front and wherein the front module frame transverse element extends backwards beyond the second shell element with an end region.

9. The passenger vehicle according to claim 5, wherein the second shell element extends forwards beyond the front module frame transverse element with a flange to which the windscreen is fixed and wherein, in the longitudinal direction of the passenger vehicle, the front module frame transverse element abuts on the flange and is fixed to the flange.

10. The passenger vehicle according to claim 5, wherein the windscreen is adjacent to a front transverse edge of the cover element of the roof module with a rear upper transverse edge.

11. A method for producing a vehicle roof of a motor vehicle provided with the roof module according to claim 1, comprising the steps of:
inserting the roof module into a roof opening of the vehicle roof;
placing the first shell element of the module frame of the roof module on a second shell element of a roof frame of the vehicle roof; and
connecting the first shell element to the second shell element to form a roof crossmember of the vehicle roof which encloses a cavity;
wherein the second shell element is connected to respective A-pillars which laterally hold and delimit a windscreen.

* * * * *